US 8,249,601 B2

(12) United States Patent
Emberson et al.

(10) Patent No.: US 8,249,601 B2
(45) Date of Patent: Aug. 21, 2012

(54) MOBILE STATION, INFRASTRUCTURE PROCESSOR, SYSTEM AND METHOD FOR USE IN CELLULAR COMMUNICATIONS

(75) Inventors: Grant M. Emberson, Basingstoke (GB); Malcolm J. Young, Victoria (GB)

(73) Assignee: Motorola Solutions, Inc., Schaumburg, IL (US)

( * ) Notice: Subject to any disclaimer, the term of this patent is extended or adjusted under 35 U.S.C. 154(b) by 867 days.

(21) Appl. No.: 11/722,384

(22) PCT Filed: Dec. 19, 2005

(86) PCT No.: PCT/US2005/046144
§ 371 (c)(1),
(2), (4) Date: Jun. 21, 2007

(87) PCT Pub. No.: WO2006/071638
PCT Pub. Date: Jul. 6, 2006

(65) Prior Publication Data
US 2008/0009291 A1     Jan. 10, 2008

(30) Foreign Application Priority Data
Dec. 29, 2004   (GB) .................................. 0428259.6

(51) Int. Cl.
*H04W 36/00* (2009.01)
(52) U.S. Cl. ..... 455/440; 455/436; 455/438; 455/456.1; 455/456.5; 455/456.6; 455/518; 370/328; 370/331
(58) Field of Classification Search .................. 455/436, 455/437–444, 456.1, 456.5, 456.6, 518; 370/331, 370/328
See application file for complete search history.

(56) References Cited

U.S. PATENT DOCUMENTS

| | | | |
|---|---|---|---|
| 5,379,446 A * | 1/1995 | Murase ........................ | 455/444 |
| 5,867,785 A * | 2/1999 | Averbuch et al. ............. | 455/436 |
| 6,292,671 B1 * | 9/2001 | Mansour ....................... | 455/518 |
| 6,373,829 B1 * | 4/2002 | Vilmur .......................... | 370/335 |
| 7,437,170 B2 * | 10/2008 | Dunn et al. .................... | 455/518 |
| 7,668,138 B2 * | 2/2010 | Abedi ............................ | 370/331 |
| 2002/0006805 A1 | 1/2002 | New | |
| 2002/0025816 A1 * | 2/2002 | Johansson et al. ............. | 455/436 |
| 2002/0077103 A1 * | 6/2002 | Bonta ............................ | 455/436 |
| 2002/0105927 A1 | 8/2002 | Holma | |
| 2003/0027572 A1 | 2/2003 | Karlsson et al. | |
| 2004/0095905 A1 | 5/2004 | Pecen | |
| 2006/0168111 A1 * | 7/2006 | Gidwani ........................ | 709/218 |
| 2009/0003279 A1 * | 1/2009 | Abusch-Magder et al. .. | 370/331 |

* cited by examiner

*Primary Examiner* — Amancio Gonzalez
(74) *Attorney, Agent, or Firm* — Terri Hughes Smith; Anthony P. Curtis; Daniel R. Bestor

(57) ABSTRACT

A mobile station for use in a cellular communication system includes a transceiver and a processor operable to apply a cell re-selection procedure which includes determining whether the mobile station should change its serving base station, wherein the transceiver is operable to receive via its serving base station a signal from an infrastructure processor advising or instructing the mobile station to select a particular base station in its cell re-selection procedure, and the processor of the mobile station is operable to apply a cell re-selection procedure to determine whether the mobile station should change its serving base station to the particular selected base station, wherein the particular selected base station has been selected and specified by the infrastructure processor based upon the location of members of a group of mobile stations with which the mobile station is to communicate.

19 Claims, 3 Drawing Sheets

MOBILE STATION, INFRASTRUCTURE PROCESSOR, SYSTEM AND METHOD FOR USE IN CELLULAR COMMUNICATIONS

CROSS REFERENCE TO RELATED APPLICATIONS

This application claims the benefit of prior filed co-pending international application Serial No. PCT/US2005/046144 filed on Dec. 19, 2005, and Great Britain application Serial No. 0428259.6 filed on Dec. 29, 2004. Both of these applications are assigned to Motorola, Inc.

The present invention relates to a mobile station, an infrastructure processor, a system and a method for use in cellular communications. In particular, the invention relates to cell re-selection of a mobile station operating in a mobile communications system.

BACKGROUND OF THE INVENTION

A cellular or trunked communication system is one in which mobile or portable user terminals, such as mobile telephones, portable radios or radios on vehicles, herein collectively referred to as 'mobile stations', can communicate via a network infrastructure which generally includes fixed installations including a plurality of fixed base stations (base transceiver stations) and various sub-systems for management and control of the system including the base stations. Each base station has one or more transceivers which serve mobile stations in a given region or area known as a 'cell' or 'site' by radio communication. The cells of neighbouring base stations are often overlapping.

Generally, it is desirable for the mobile stations to be served by a base station which can provide good radio signals to and from the mobile station. Since mobile stations can move from one region to another it is known for the mobile stations to monitor signals from different base stations, to operate a procedure to determine which base station can best serve the mobile station, to determine whether it would be worthwhile to switch from a current serving base station to another one and if appropriate to carry out such a switch. In the art, the procedure to monitor for and to make determinations regarding a possible switch is known as a 'cell re-selection' procedure. This usually operates in two stages, namely (i) a first stage in which the mobile station draws up a list of candidate non-serving base stations to which it could potentially switch to as its serving base station, including a preferred non-serving base station which is selected to be top of the list; and (ii) a second stage in which measurements are carried out comparing properties of the preferred non-serving base station with those of the current serving base station and determining whether certain criteria are met which require a switch to the preferred base station to be made. Where such criteria are met, a procedure known as 'handover' or 'handoff' is carried out to effect such a switch.

There are various parameters which are used in a cell re-selection procedure in known systems to allow a mobile station to select between base stations either in the first stage or in the second stage referred to above. The parameters used may for example be selected from: (i) received signal strength from a given base station at the mobile station; (ii) signal quality (e.g. bit error rate) of a signal received at the mobile station from a given base station; (iii) subscriber class (explained below); (iv) cell priority (explained below); (v) services available from a given base station/cell; (vi) preferred cell of the mobile station (e.g. its 'home' cell); and (vii) cell loading of a given cell supported by a particular base station.

For example, in TETRA systems, i.e. those that operate in accordance with TETRA (Terrestrial Trunked Radio) standards defined by the European Telecommunications Standards Institute (ETSI), the parameters used by a mobile station include recorded received signal strength (energy) values plus some service parameters. Each base station continuously broadcasts to mobile stations served by that station information relating to neighbour base stations which could potentially serve the mobile stations. The information is broadcast on a control channel. The information includes channel frequencies and other data which allows each mobile station easily to search for other base stations. Each mobile station runs an algorithm which produces a list of suitable neighbouring base stations from which it can select a base station to which it could undergo handover.

Allocating each mobile station into a 'subscriber class' as referred to above is a known grouping technique. The population of mobile stations may be split say into three classes A, B and C. Some sites may advertise that they only allow or prefer class A. A mobile station that is configured as a member of Class C will not use or prefer that site. The TETRA standard supports use of 16 such subscriber classes.

The 'cell priority' referred to above indicates whether a cell is a 'priority cell' or not. Some cells may be designated as 'priority cells' within the system management. If a mobile station in the process of selecting a cell can detect a priority cell and a non-priority cell then the priority cell should be selected in preference. An application of priority cell could be in an 'umbrella cell' scenario: for example, say there are several 'regular' cells and one 'umbrella' cell. If a mobile station can detect a regular cell then this should be selected as a priority cell. The umbrella cell is a non-priority cell and should be selected only if no regular cells can be detected, so that the umbrella cell does not become overloaded.

When a mobile station determines in the second stage of cell re-selection that the link with the current serving base station as defined by one or more of the parameters described above should be exchanged with a better link it abandons the link with the current serving base station and undergoes handover to the 'best' neighbour base station which is top of the list of non-serving base stations that it has compiled.

In some cellular or trunked systems, e.g. those used for communications in public safety services, it is usual for users to communicate in groups (often referred to as 'talkgroups'). The population of mobile stations belonging to a particular group can be spread throughout the system. In other words, the mobile stations which are members of the group can be served by many different base stations. This spread of service throughout the system can result in less than optimal use of traffic channels in the system since a traffic channel has to be assigned at each base station where a mobile station is attached (served) to a particular group.

BRIEF DESCRIPTION OF THE DRAWINGS

Embodiments of the present invention will now be described by way of example with reference to the accompanying drawings.

DESCRIPTION OF EMBODIMENTS OF THE INVENTION

The present inventors have appreciated that use of traffic channels in a trunked or cellular communication system can be improved by involvement of the infrastructure in selection of base stations to which mobile stations are to be attached using information held by the infrastructure relating to location (in terms of cellular attachment) of mobile stations which are members of the same group.

By the invention, cell re-selection by one or more mobile stations in a cellular communication system is assisted or directed by a processor included in infrastructure of the system. At the request of the mobile station or at the discretion of the infrastructure, the infrastructure processor selects and specifies a particular non-serving base station that each mobile station should use in a cell re-selection procedure to determine whether the mobile station should undergo serving base station handover. The designated non-serving base station is selected by the infrastructure processor based upon the location of members of a group of mobile stations with which the mobile station is to communicate. Details of the group or groups of which each mobile station is a member may have previously been sent by the mobile stations to the infrastructure processor. The infrastructure processor may operate in conjunction with a memory which holds a database of locations, e.g., cell locations, of mobile stations and a database of membership of mobile station groups.

The invention allows steering of mobile stations in cell re-selections to be optimised by the infrastructure processor according to location of mobile stations which are members of the same group, especially the same primary group. Beneficially, the invention helps to reduce the number of traffic channels needed for a group communication and/or allows more group communications to be supported by a given number of traffic channels. These benefits can provide significant operational cost reductions to a communication system operator.

The invention is especially applicable in any cellular system which uses group communication as a primary or frequent procedure. Such systems include (i) TETRA systems—systems which operate in accordance with the TETRA standards as defined by the European Telecommunications Standards Institute; (ii) APCO systems—systems which operate in accordance with the APCO Project 25 standards defined by the Associated Public-Safety Communications Officers; (iii) cellular or PTT-over-cellular (PoC) mobile telephone/data communication systems with group communication facilities.

Figure 1:
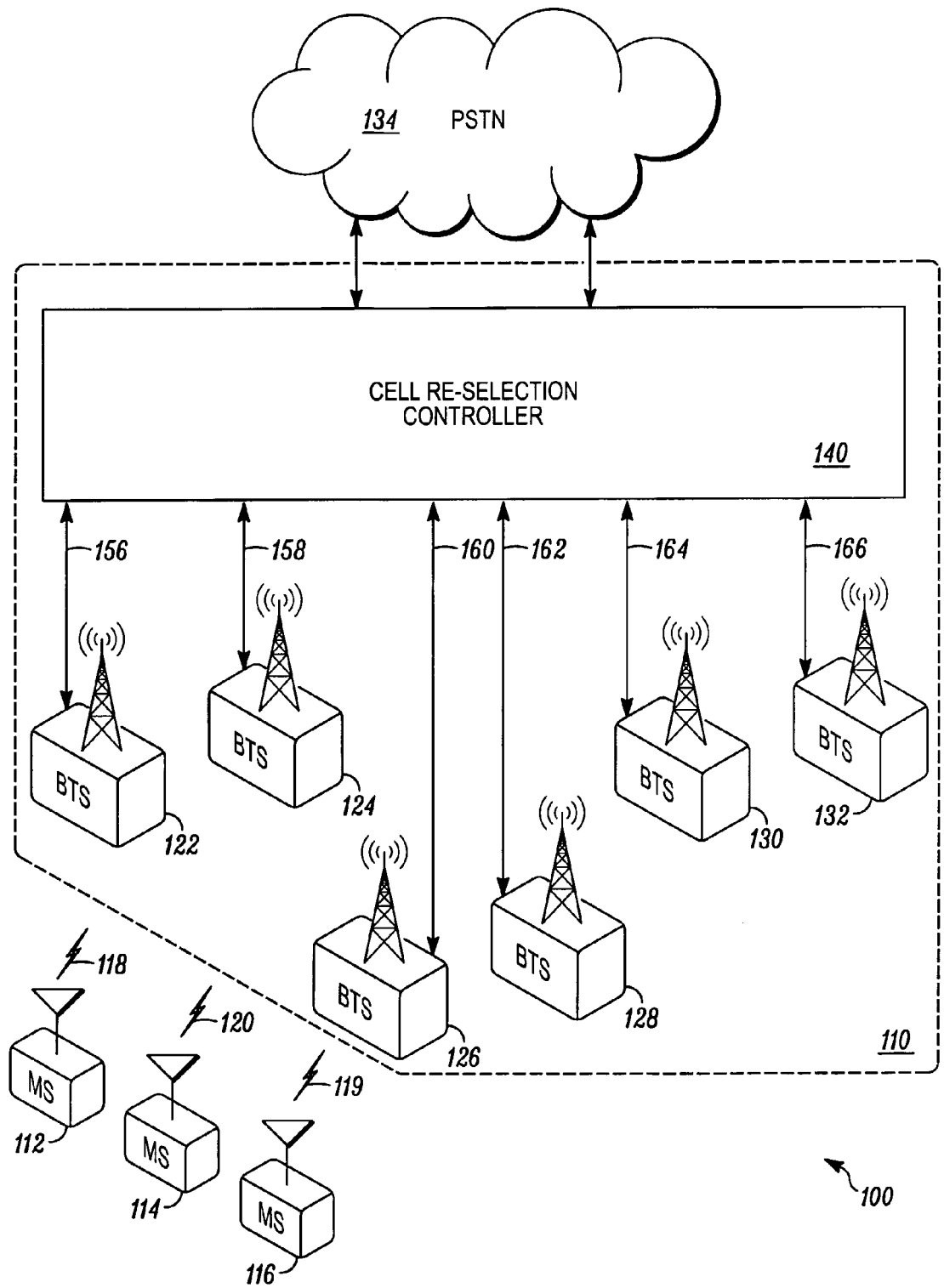
FIG. 1 is a block schematic diagram illustrating layout of system components in a trunked communication system.

FIG. 1 shows a schematic layout of a cellular/trunked communication system 100 in which an embodiment of the invention may be implemented. A plurality of subscriber terminals, such as a plurality of MSs (mobile stations), three of which are shown, namely MSs 112,114 and 116, have air interface communication links 118, 120 and 119 with a plurality of BTSs (base transceiver stations) 122,124 and 126. Further BTSs 128, 130 and 132 are also shown The system 100 is a TETRA system and includes an infrastructure 110, which contains substantially all of the system elements apart from the mobile stations including the MSs 112-116. The BTSs 122-132, which are part of the infrastructure 110, are connected to a switching and management installation 140 which carries out the functions of the infrastructure 110 apart from the base stations 122-132. The installation 140 may, as shown, be connected to a conventional public-switched telephone network (PSTN) 134 to provide communications into and out of the network provided by the system 100. The installation 140 may, alternatively or in addition, have direct connections to other cellular networks.

Each of the BTS 122-132 is principally designed to serve its primary cell, with each BTS 122-132 incorporating one or more transceivers. The BTSs 122-132 have communication links 156,158, 160,162, 164 and 166 respectively with the installation 140 by which they may communicate with the component functional units or sub-systems of the installation 140 and with one another as well as with terminals outside the system 100 via the PSTN 134 or via other inter-network links.

Figure 2:
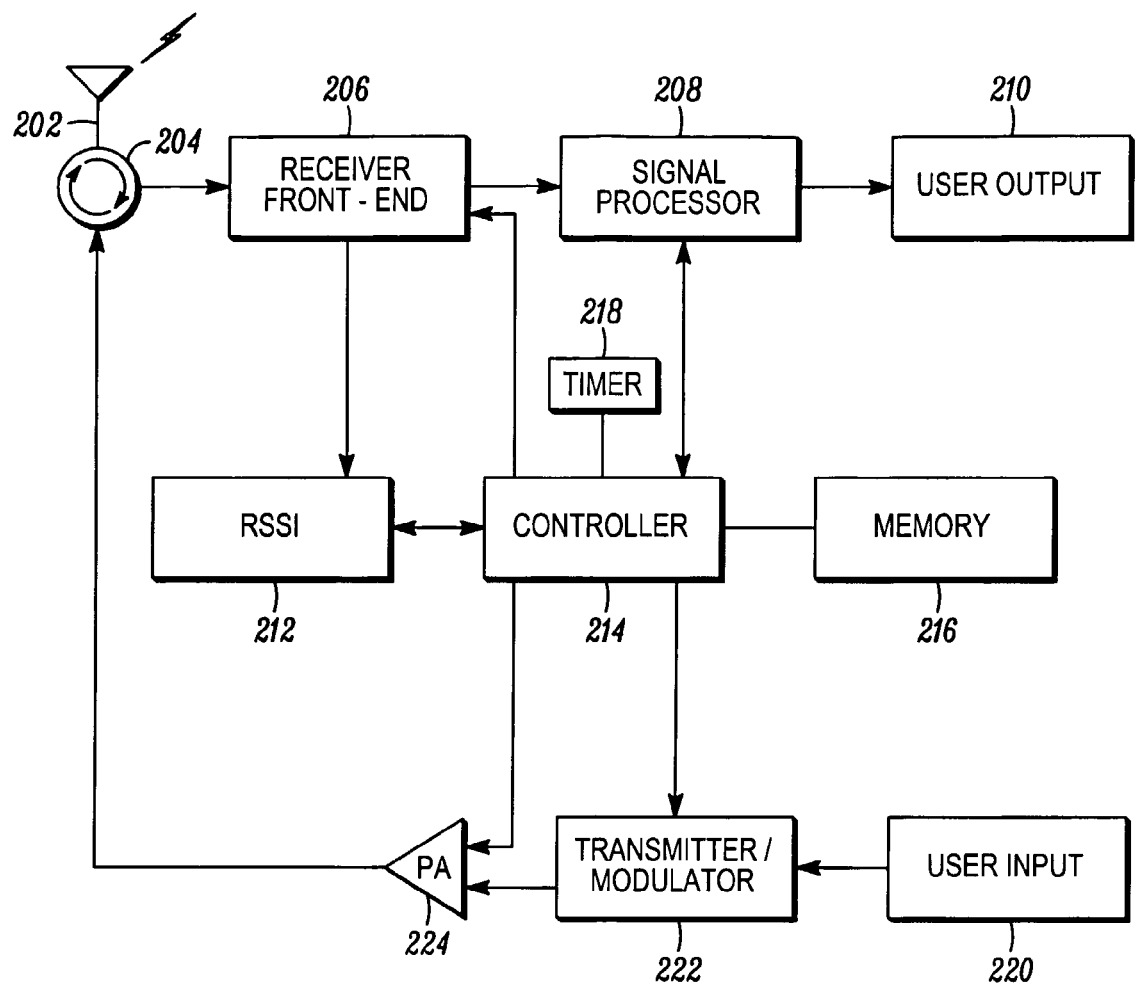
FIG. 2 is a block schematic diagram of an arrangement of functional components in a mobile station in the system of FIG. 1.

FIG. 2 shows an arrangement 200 of the main functional components of a mobile station (e.g. the MS 112) in the system 100 of FIG. 1. The arrangement includes an antenna 202 coupled to a circulator 204 (or switch or duplex filter) providing isolation between transmitter and receiver chains.

Incoming signals from the antenna 202 are passed via the circulator 204 to a receiver chain which includes a receiver front-end 206 which comprises circuitry which provides reception, filtering and down-conversion to base-band frequency signals. The receiver front-end 206 is serially coupled to a signal processor 208 which extracts information from a base-band signal recovered from the receiver front-end 206. The signal processor 208 operates under control of a controller 214 which generally controls all functional operations in the mobile station arrangement 100. The controller 214 is a programmed digital signal microprocessor. Output information from the signal processor 208 is provided to a user at a user interface output 210 which may for example comprise a speaker and/or a visual display, depending on the type of information (e.g. speech, data, picture, video etc) to be output.

A RSSI (received signal strength indicator) 212 is also connected to the receiver front-end 206. The RSSI 212 measures the strength (energy) of a received signal in a known manner and provides an input to the controller 214 giving information on the RSSI of a currently received signal.

Coupled to the controller 214 is a memory 216 which stores data and programs needed for use by the controller 214. A timer 218 is coupled to the controller 214 to control timing of operations within the arrangement 200.

The transmitter chain of the arrangement 200 includes a user input 220 such as a microphone, keypad, camera etc. The user input 220 provides input information or data to be communicated from a user and is connected in turn to a transmitter/modulator 222 and a power amplifier (PA) 224, both of which are under the control of the controller 214. An output from the power amplifier 224 is provided as an output signal for radio transmission by the antenna 202 and is provided to the antenna 202 via the circulator 204.

The various components within the arrangement 200 can be realised in a discrete or integrated form.

Thus, all RF signals received by the MS 112 at the antenna 202 are passed via the circulator 204 to the receiver front-end 206, are extracted by the signal processor 208 and passed to the controller 214. Any received information to be saved is stored in the memory 216. All signals sent by the MS 112 are sent in baseband digital form from the controller 214 to the transmitter/modulator 222 from which they are passed in RF form via the power amplifier 224 and circulator 204 to be sent over the air by the antenna 202.

Figure 3:
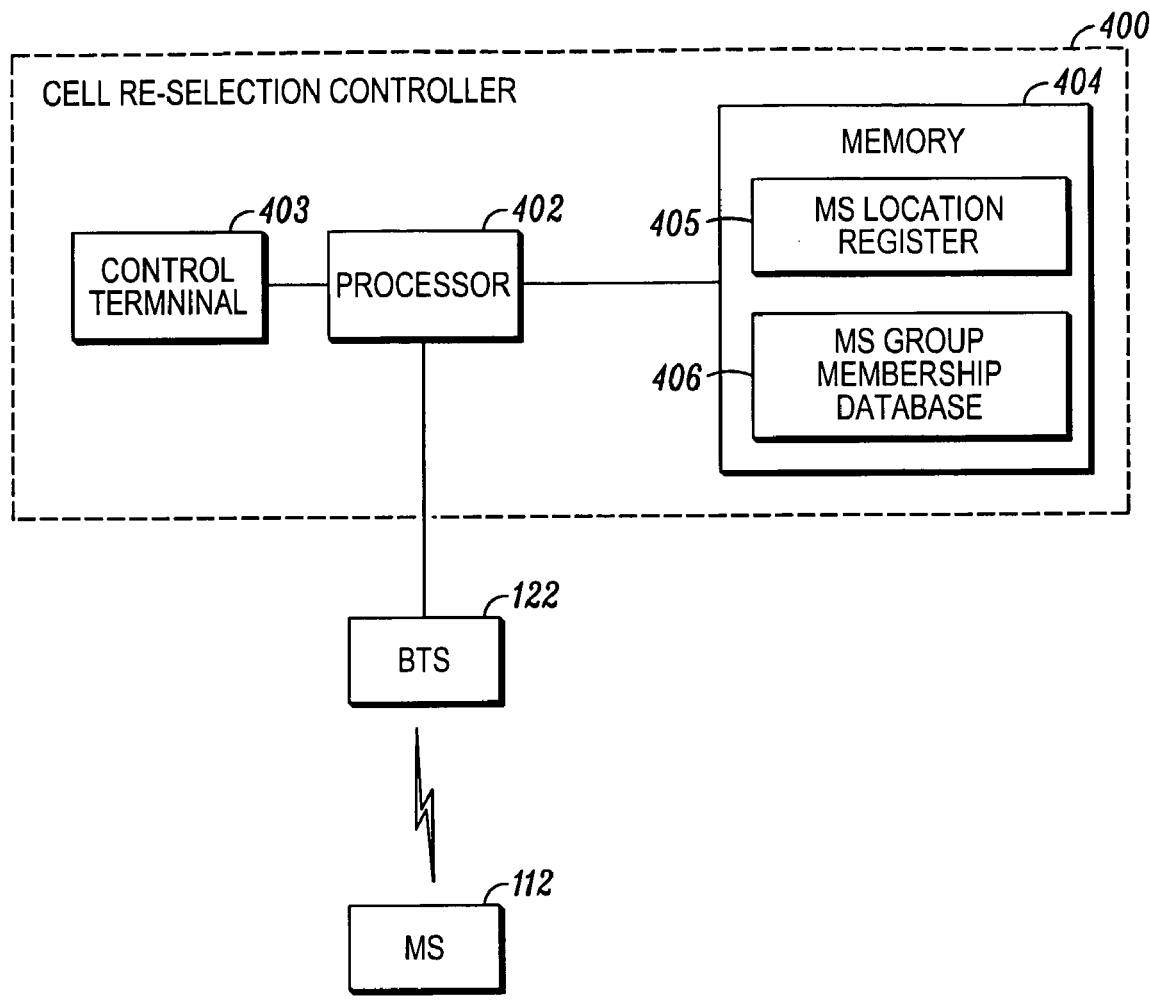
FIG. 3 is a block schematic diagram of selected components in the system of FIG. 1 showing more detail of a cell re-selection controller included in the system.

FIG. 3 shows in more detail the functional units involved in cell re-selection and illustrates how cell re-selection may be carried out by a particular mobile station, MS 112, in the system 100 shown in FIG. 1, with infrastructure assistance in accordance with an embodiment of the invention. For simplicity, FIG. 3 shows only the relevant parts of the system 100. As was seen with reference to FIG. 1, the MS 112 is currently served by BTS 122 which sends RF signals to the MS 112 and receives RF signals from the MS 112. The MS 112 communicates with a cell re-selection controller 400 via the serving BTS 122. The controller 400 is contained within the infrastructure 110. The cell re-selection controller 140 includes a processor 402 (e.g. a programmed digital signal processor), a control terminal 403 and a memory 404 including a MS location register 405 and a MS group membership database 406. The processor 402 allows signals to be processed and decisions to be made using information in the processed signals. The control terminal 403 connected to the processor 402 allows a system manager manually to enter or receive data relating to the system 100. For example, the system manager may enter data relating to a group that a particular MS is to join. The MS location register 405 maintains a record of the current cell to which each MS in the system is attached. Thus, when a MS undergoes cell handover, the cell of the new serving base station is recorded in the MS location register. The MS group membership database 406 records current data relating to what MS groups exist in the system and what MSs are members of those groups. Thus, by reference to the MS location register 405 and the MS group membership database 406, the processor 402 is aware of the current cell location of all MS members of any given MS group. In particular, for the MS 112, the processor 402 is aware of the current cell location of the MS members of the primary group to which that MS belongs.

When the MS 112 first registers with the system infrastructure 110 it indicates that group communication services, such as group call or group short data services, are required by notifying the system infrastructure of the group IDs pertaining to the group services. This may, for example, be due to a service selection made by a user from a given menu of options displayed by the MS 112. A message sent from the controller 214 of the MS 112 indicating this requirement reaches the processor 402 via the BTS 122. The processor 402 updates the data in the MS group membership database 406 relating to the groups of which the MS 112 is a member, especially the primary group. Alternatively, the processor 402 may request the MS 112 to identify its particular groups including its primary group, and the MS 112 identifies these groups accordingly, each by a group ID, sent in a message from the controller 214. The provision of group IDs in a TETRA mobile station is normally done by a radio services manager (who is normally the person who is provisioning the mobile station). These IDs are usually accompanied with meaningful aliases for the radio user to select such as "traffic police 1" or "Basingstoke Town Centre" or "School Friends". It is possible however to provide an operational software application in the mobile station allowing the user to add group IDs and aliases from available lists in a manner similar to that used in e-mail systems. The identity and alias of the group(s) to which the MS belongs may for example be suitably stored in the memory 216 as well as in the database 406.

When the MS 112 moves away from the centre of its current serving cell its controller 214 is ready to begin a cell re-selection procedure. The controller 214 of the MS 112 sends a signal to the processor 402 to indicate that the MS 112 is ready to begin cell re-selection. This signal is sent in its over-the-air link 118 (between the antenna 202 and the BTS 122) on a control channel. The processor 402 receives this signal from the BTS 122 and, in response, draws up a list of non-serving BTSs that are preferred by the system infrastructure 110 for the MS 112 to become attached to. This list could for example consist of the BTSs 124, 126, 128, 130 and 132. The list is drawn up by the processor 402 using information retrieved by the processor 402 from the databases 405 and 406 relating to the current location of the members of the groups of which the MS 112 is a member, particularly its primary group. The objective followed by the processor 402 is to minimise the number of cells in use for the primary group of the MS 112 (and if appropriate for any other important groups of which the MS 112 is a member). A signal recommending or instructing the MS 112 to try the BTSs of the selected list in its cell re-selection procedure is sent back to the controller 214 of the MS 112 via the communication chain described above. The signal is sent on a system control channel in the over-the-air link 118 between the BTS 122 and the antenna 202. The information relating to the specified BTSs is stored in the memory 216.

The MS 112 carries out a first stage of a cell re-selection procedure in which it carries out its own determination of which of the cells or BTSs that have been specified by the processor 402 are suitable to use in the next stage of cell re-selection. This determination is carried out by the controller 214 in a known manner. The controller 214 may for example assess suitability using one or more parameters such as: (i) received signal strength from the base station at the mobile station; (ii) signal quality of a received signal from the base station at the mobile station; (iii) subscriber class; (iv) services available from the base station; (v) cell priority; (vi) preferred cell of the mobile station; and (vii) current cell loading. Where the assessment is carried out using received signal strength, the received signal strength is measured in a known manner by the RSSI 212 (FIG. 2)

The analysis of the specified BTSs by the controller 214 results in a reduced number of base stations found as suitable for the MS 112. The reduced list may for example consist of the BTSs 124, 126 and 128. The controller 214 of the MS 112 generates and sends to the processor 402 via the communication chain between the two a signal specifying the suitable BTSs in the reduced list. The signal is again sent on a system control channel in the over-the-air link 118 between the antenna 202 and the BTS 122.

The processor 402 further applies its intelligence, using stored information relating to the cell location of MS group members of the groups to which the MS 112 belongs, to select which of the BTSs specified in the reduced list is the best one, from a system resource allocation point of view, for the MS 112 to use in any handover. Again, the primary group of the MS 112 will have most influence on the selection decision made by the processor 402. However, one or more other groups to which the MS 112 belongs may be taken into account by the processor 402, depending on the importance of the group or groups.

The processor 402 sends a signal back to the MS 112 with an instruction to use the particular BTS it has selected for use in the second stage of the cell re-selection procedure. This particular BTS could for example be the BTS 126. This signal is again sent in the over-the-air link 118 between the BTS 122 and the antenna 202 on a control channel. The signal is received by the controller 214. The controller 214 in response stores any received information in the memory 216 then runs (using a stored program) a second stage of the cell re-selection procedure in which it compares the particular specified non-serving BTS 126 with the current serving BTS 122. For example, according to TETRA standard procedures, the comparison includes determining whether a received signal strength from the current serving base station as measured by the RSSI 212 is less than a pre-determined threshold, details of which are stored in the memory 216, and also that the received signal strength from the current serving BTS 122 is less than that from the specified non-serving BTS 126 by at least a minimum signal strength difference. Where the results of these determinations are positive, i.e. the controller 214 determines that the conditions for cell handover are satisfied, the controller 214 initiates and executes a cell handover procedure for the MS 112 to become attached to the specified BTS 126 in a known manner.

In the cell re-selection procedure described in the illustrated embodiment above, the processor 402 initially selects a list of candidate BTSs for the MS 112 to try. The MS 112 then tries the BTSs in the list and produces a decision as to whether each BTS is suitable or not. This results in a reduced list of suitable BTSs which is sent back to the processor 402. The processor 402 then selects a single BTS from the reduced list. Thus, the process of finding the single selected BTS can be considered arrived at by a negotiation between the MS 112 and the processor 402. In a more extreme example, for example where a particular MS is the lone member of a particular group in a particular cell location, the processor 402 could continually suggest a preferred BTS to which the MS should attach without giving the MS an opportunity to indicate a suitability of that BTS by assessing received signals etc from that BTS as in the cell re-selection procedure described above.

In the procedure in the illustrated embodiment described above, the MS 112 tailors its BTS options in cell re-selection to the list of candidate BTSs supplied to it by the processor 402. However, if the initial list of BTSs supplied by the processor 402 contains no BTS that the MS 112 finds suitable when it carries out the first stage of cell re-selection, the controller 214 may send a signal to the processor 402 to indicate this finding. The processor 402 may then produce a further list of BTSs for the MS 112 to try, and so on. Again these are selected by the processor 402 by reference to the distribution of MS group members of the primary or other group(s) of the MS 112. If ultimately following this procedure no BTS is found by the MS 112 (specifically by the controller 214) to be suitable, the processor 402 may reject the cell re-selection request by the MS 112 and issue a reject signal accordingly resulting in no service to the MS 112. Alternatively, the processor 402 may exceptionally allow the MS 112 to proceed with cell re-selection and handover to a cell not preferred by the processor 402. Which of these decisions is taken by the processor 402 may depend on system usage factors such as cell loading, relative priority of users and relative priority of talkgroups. As noted earlier, cell re-selection is carried out based on system loading as a result of current distribution of group members rather than solely on radio signal parameters and/or on statically defined criteria as determined by the MS.

In a further alternative embodiment of the invention the processor 402 may instigate cell selection because of loading, e.g. overloading, of certain cells. For example if there is a first MS, MS-A, in a talkgroup, TG1, attached to a first cell (Cell X) and an adjacent cell (cell Y) has one or more MS participating in the same talkgroup TG1, the processor 402 may direct MS-A to re-attach to Cell Y and thereby release traffic channel resource on Cell X.

Beneficially, as noted earlier, the invention helps to reduce the number of traffic channels needed for a group communication and/or allows more group communications to be supported by a given number of traffic channels. These benefits can provide significant cost advantages to a cellular communication system operator.

Although the infrastructure processor employed in the invention is described in the illustrated embodiment described above as being (the processor 402) associated with a control terminal 403 and a memory 404, the processor need not be in the same sub-system as a control terminal or in the same sub-system as a memory. The control terminal and the memory could be located elsewhere in the infrastructure 110. Furthermore, the processor 402 may be located in various one of various units or sub-systems within the infrastructure 110. For example, as will be apparent to those skilled in the art, the processor 402 could be located in any of the following (if present in the infrastructure 110): a central operations and management centre, a mobile switching centre or router, or a base station controller or a base transceiver station, or elsewhere in the system infrastructure 110.

The invention claimed is:

1. A mobile station for use in a cellular communication system including a receiver and a processor operable to apply a cell re-selection procedure which includes determining whether the mobile station should change a currently serving base station, wherein the receiver is operable to receive from an infrastructure processor a list of non-serving base stations selected by the infrastructure processor which are suitable to be selected as a serving base station in the cell re-selection procedure and the receiver is further operable to receive via the currently serving base station a selection signal from the infrastructure processor indicating that the mobile station should select a particular base station in the cell re-selection procedure based upon the location of members of a talkgroup of which the mobile station is a member, and the processor of the mobile station is operable to apply the cell re-selection procedure to determine whether the mobile station should change the currently serving base station or to apply a handover to the particular base station.

2. A mobile station according to claim 1 wherein the mobile station includes a transmitter operable to send signals to the infrastructure processor via the currently serving base station and the receiver is operable to receive signals from the infrastructure processor via the currently serving base station, the transmitter of the mobile station is operable to send to an infrastructure processor a talkgroup signal including information relating to one or more talkgroups of mobile stations with which it is intended that the mobile station is to communicate.

3. A mobile station according to claim 2 wherein the talkgroup signal includes details of a plurality of groups of mobile stations and one of the groups is a priority talkgroup for the mobile station.

4. A mobile station according to claim 3 wherein the mobile station is operable to receive from the infrastructure processor a list of non-serving base stations selected by the infrastructure processor which are suitable to be selected as a serving base station in the cell re-selection procedure.

5. A mobile station according to claim 4 wherein the mobile station is operable to apply a first stage of the cell re-selection procedure to generate a suitability signal including information relating to the suitability of the non-serving base stations selected by the infrastructure processor and send the suitability signal to the infrastructure processor.

6. A mobile station according to claim 5 wherein the receiver of the mobile station is operable to receive from the infrastructure processor in response to the suitability signal a signal indicating one of the list of non-serving base stations selected as the particular base station and the processor of the mobile station is operable to apply a second stage of the cell re-selection procedure using a comparison between the currently serving base station and the particular base station to determine whether the mobile station should change the currently serving base station or to apply a handover to the particular base station.

7. A mobile station according to claim 5-1 wherein the mobile station is operable to apply a first stage of the cell re-selection procedure to generate a suitability signal including information relating to the suitability of the non-serving base stations selected by the infrastructure processor and send the suitability signal to the infrastructure processor.

8. A mobile station according to claim 7 wherein the processor of the mobile station is operable in the first stage of the cell re-selection procedure to establish suitability of each non-serving base stations in the list using one or more parameters selected from: (i) received signal strength from the base station at the mobile station; (ii) signal quality; (iii) subscriber class; (iv) services available from the base station; (v) cell priority; (vi) preferred cell of the mobile station; and (vii) cell loading.

9. A mobile station according to claim 7 wherein the receiver of the mobile station is operable to receive from the infrastructure processor in response to the suitability signal a signal indicating one of the list of non-serving base stations selected as the particular base station and the processor of the mobile station is operable to apply a second stage of the cell re-selection procedure using a comparison between the currently serving base station and the selected particular base station to determine whether the mobile station should change the currently serving base station or to apply a handover to the particular base station.

10. A mobile station according to claim 7 wherein the particular base station is selected by the infrastructure processor from only the non-serving base stations determined to be suitable by the processor of the mobile station.

11. A mobile station according to claim 1 wherein the processor of the mobile station is operable to apply a first stage of the cell re-selection procedure to determine whether service handover to the particular base station should be made, wherein the procedure includes comparing whether a received signal strength from the currently serving base station is less than a pre-determined threshold and less than a received signal strength from the particular base station by a pre-determined signal strength difference.

12. A mobile station according to claim 1 wherein the number of non-serving base stations selected by the infrastructure processor are fewer than all non-serving base stations with which the mobile station is able to communicate.

13. A mobile station according to claim 1 wherein when the processor of the mobile station determines there are no suitable base stations in the list and indicates this to the infrastructure processor, the receiver receives from the infrastructure processor a new list with at least one different preferred non-serving base station.

14. A mobile station according to claim 1 wherein when the processor of the mobile station determines there are no suitable base stations in the list and indicates this to the infrastructure processor, the receiver receives from the infrastructure processor an instruction to determine and perform handover to a non-serving base station not in the list.

15. A mobile station according to claim 1 wherein the receiver receives an initiation signal from the processor instigating cell selection by the mobile station.

16. A mobile station according to claim 1 wherein the mobile station belongs to a plurality of different talkgroups, including a primary talkgroups, the primary talkgroups has the most influence on selection of the particular base station, and other talkgroups are taken into account in the selection depending on the importance of the other talkgroups.

17. A mobile station according to claim 1 wherein:
the receiver receives from the infrastructure processor a list of preferred non-serving base stations to which the mobile station is able to be attached, the preferred non-serving base stations capable of being fewer than all non-serving stations to which the mobile station is able at the present time to be attached, the preferred non-serving base stations selected by the infrastructure processor using information relating to the location of members of at least one talkgroup of which the mobile station is a member,
in response to receiving the list, the processor of the mobile station determining suitable base stations in the list and provides the suitable base stations to the infrastructure processor, the suitable base stations capable of being fewer than preferred non-serving base stations, and
the particular base station selected is selected by the infrastructure processor from the suitable base stations.

18. A mobile station according to claim 17 wherein the mobile station belongs to a plurality of different talkgroups and the preferred non-serving base stations selected by the infrastructure processor using information relating to the location of members of the different talkgroups.

19. A method of operation in a cellular communication system including (i) a system infrastructure including a plurality of base stations and a processor; and (ii) a plurality of mobile stations wherein at least one of the mobile stations includes a transmitter, a receiver and a processor operable to apply a cell re-selection or handover procedure, wherein the method includes the processor of the system infrastructure sending to the mobile station a list of non-serving base stations selected by the system infrastructure which are suitable to be selected as a serving base station in the cell re-selection or handover procedure and the method includes the processor of the system infrastructure sending to the mobile station a signal indicating to the mobile station to select a particular base station in the cell re-selection or handover procedure based upon the location of members of a talkgroup of mobile stations of which the mobile station is a member, receiving the signal by receiver of the mobile station and applying by the processor of the mobile station the cell re-selection or handover procedure using the selected particular base station.

\* \* \* \* \*

UNITED STATES PATENT AND TRADEMARK OFFICE
CERTIFICATE OF CORRECTION

| | | |
|---|---|---|
| PATENT NO. | : 8,249,601 B2 | Page 1 of 1 |
| APPLICATION NO. | : 11/722384 | |
| DATED | : August 21, 2012 | |
| INVENTOR(S) | : Emberson et al. | |

It is certified that error appears in the above-identified patent and that said Letters Patent is hereby corrected as shown below:

In Column 8, Line 66, in Claim 7, delete "5-1" and insert -- 1 --, therefor.

Signed and Sealed this
Twelfth Day of February, 2013

Teresa Stanek Rea
*Acting Director of the United States Patent and Trademark Office*